United States Patent Office 3,450,969
Patented June 17, 1969

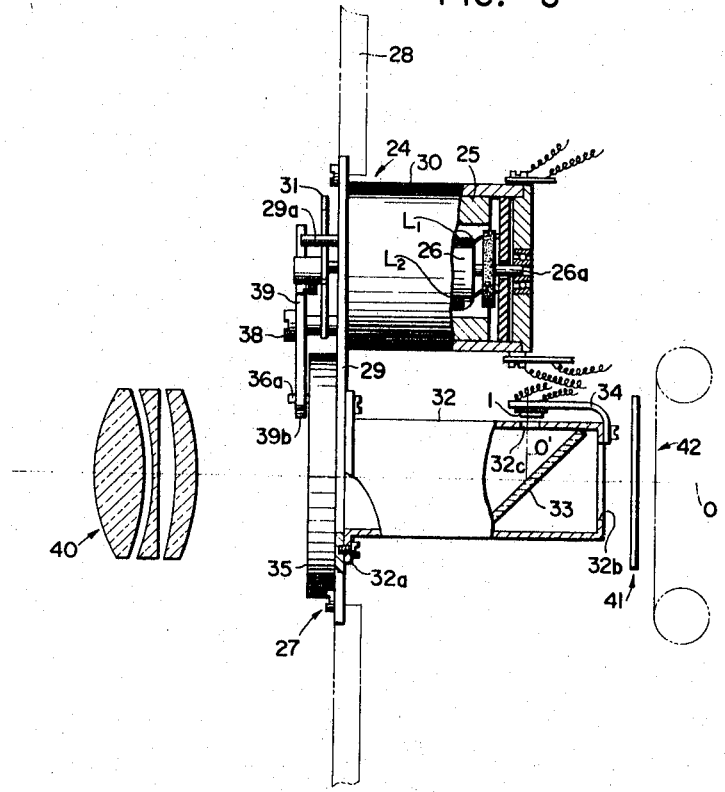

3,450,969
PHOTO-RESISTANCE BRIDGE SERVO-MECHANISM
Takayoshi Sato, Tokyo-to, Hiroshi Ueda, Yokohama, and Atsutada Nakatani and Ohtake Minoru, Tokyo-to, Japan, assignors to Kabushiki Kaisha Koparu, Tokyo, Japan
Filed Aug. 18, 1966, Ser. No. 573,260
Claims priority, application Japan, Nov. 6, 1965, 40/68,172; May 27, 1966, 41/34,128
Int. Cl. H02p 7/68, 7/74
U.S. Cl. 318—18                    5 Claims The present invention relates to a servo-mechanism, and more particularly to a servo-mechanism having a highly efficient controlling ability.

A servo-mechanism comprising, in general, a bridge circuit of a Wheatstone type having, in one of the branches thereof, either a photoconductive element which undergoes a change in its resistance value in response to a change in the intensity of an incident light, or a thermal sensing resistor which undergoes a change in its resistance value in accordance with a change in the ambient temperature, or a pressure sensing resistor which undergoes a change in its resistance value in response to a change in the pressure applied thereto to serve as a detecting element for the detection of a change in either the intensity of an incident light, the temperature or the pressure, and being operative so that the voltage, which is generated in the output connections of the Wheatstone bridge when the latter is placed into an unbalanced state due to the change in the resistance value of the aforesaid detecting element, will control a switching circuit composed of a p-n-p type transistor and an n-p-n type transistor so as to cause an electric current to flow, in a direction complying with the polarity of the voltage generated in the output connection of the Wheatstone bridge, through an energizing coil of an electromagnetic device (such as an electric motor or an electric meter) comprising said energizing coil connected to a common emitter electrode of said transistors and to a power source terimnal and also comprising a movable element which is adapted to interact with said energizing coil, to thereby displace the position of said movable element, whereby to control said Wheatstone bridge so as to be balanced again by virtue of a mechanism which works in synchronism with said displacement, to convert the change in the state of either the incident light, the applied temperature or the pressure, into a mechanical motion of displacement, is known.

However, such servo-mechanism of the prior art had the inconveniences that, for example, the movable element starts oscillation when the state of the Wheatstone bridge approaches the balancing point, or that the movable element effects stepwise displacement during its motion of displacement, or that the transistors in the circuit become inoperative when the voltage generated in the output connection of the Wheatstone bridge is small due to the reasons including the inertia of the movable element, the operation characteristics of the transistors, the state of the magnetic coupling between the electric circuit and the electromagnetic device, and the mutual magnetic actions within the entire servo-mechanism.

It is, therefore, the primary object of the present invention to provide a servo-mechanism which is so operative that the movable element makes movement always at a constant velocity and that the movement of the movable element ceases instantaneously when the Wheatstone bridge is balanced, by the provision of a damping coil for connection between the common base electrode of the switching transistors and one of the output connections of the Wheatstone bridge in the servo-mechanism of the described type, said damping coil being wound around said movable element and being so operative that the polarity of the induced voltage generated therein is opposite to that of the voltage generated in the output connection of the Wheatstone bridge, to thereby cause a constant current to flow in the energizing coil independently of the magnitude of the voltage generated in the output connection of the Wheatstone bridge.

Another object of the present invention is in an improvement of the servo-mechanism of the described type in such manner that any reduction in the dynamic sensitivity of the switching transistors due to the influence of their base voltages may be avoided by displacing the working points of said switching transistors, to thereby insure that the movable element can be displaced immediately upon the occurrence of a slight voltage in the output conection of the Wheatstone bridge.

Still another object of the present invention is in an improvement of the servo-mechanism of the described type by removing the alternating current of a relatively high frequency which is liable to flow in the energizing coil, to thereby obtain a smooth and continuous displacement of the movable element.

The present invention will become more apparent by reading the following detailed descriptions with reference to the accompanying drawings which are given simply by way of example, wherein:

FIG. 3 is a side elevational view, partly broken away, of the apparatus shown in FIG. 2.

Description will now be directed to the electric circuit and also to the electromagnetic device fabricated according to one embodiment of the present invention.

Figure 1:
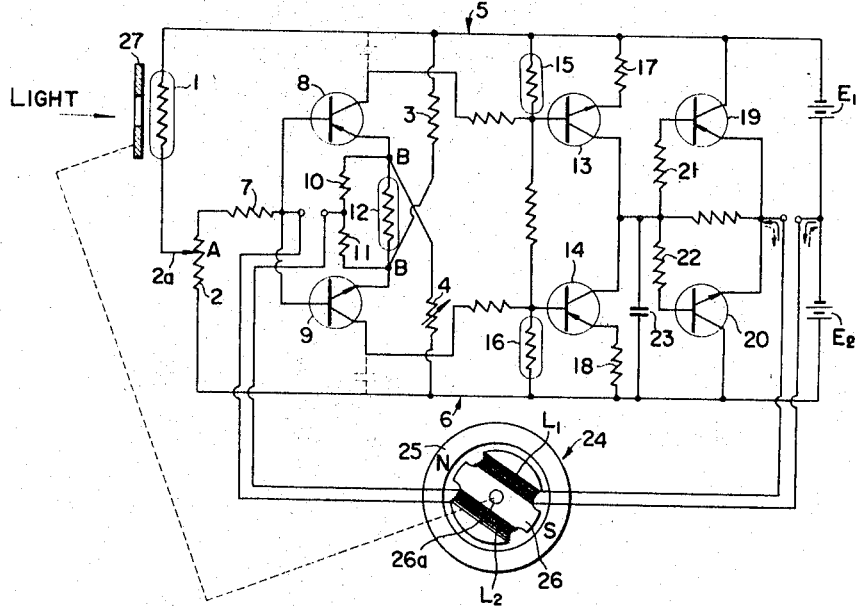
FIG. 1 is a schematic view illustrating the manner in which the apparatus fabricated according to the present invention is coupled with one embodiment of the electric circuits used in the present invention.

In FIG. 1 of the drawings is shown a switching circuit comprising an electric bridge of Wheatstone type including a photo-resistor consisting of a photoconductive material such as cadmium sulfide and two p-n-p and n-p-n type switching transistors connected to output junction points of said Wheatstone bridge, a transistor amplifier connected to said switching circuit; and also an electromagnetic device comprising an energizing coil connected to the output side of said transistor amplifier, and a damping coil connected to the base electrode and to the emitter electrode of said switching transistors.

Said Wheatstone bridge comprises a photo-resistor 1 which undergoes a change in its resistance value in response to the amount of an incident light, a variable resistor 2, a resistor 3, and a semi-fixed resistor 4 for controlling the balancing point of said bridge circuit, wherein the point of junction between one terminal of said photo-resistor 1 and the resistor 3 is connected, by means of line 5, to the negative terminal of a power source $E_1$, while the point of junction between one terminal of said variable resistor 2 and the semi-fixed resistor 4 is connected, by means of the line 6, to the positive terminal of a power source $E_2$. The other terminal of the photo-resistor 1 is connected to a slider $2a$ of the variable resistor 2, while the other end of said variable resistor 2 is connected, through a bias resistor 7, to the common base electrode of the p-n-p type and n-p-n type switching transistors 8 and 9. Between the respective emitter electrodes of the transistors 8 and 9 are inserted, for connection in series, two resistors 10 and 11. In addition, another resistor or a thermistor 12 is inserted for connection in parallel to both of said resistors 10 and 11.

Also, one end of the semi-fixed resistor 4 is connected to the joint of the resistor 10 and the thermistor 12, and a resistor 3 is connected to the point of connection between the thermistor 12 and the resistor 11.

Each of the collector electrodes of the switching transistors 8 and 9 is connected, through a resistor, to each of the base electrodes of the transistors 13 and 14; while the thermistors 15 and 16 are connected, respectively, to the lines 5, 6 and to the base electrodes of the transistors 13, 14, these latter transistors being connected to each other by means of a resistor. Furthermore, the respective emitter electrodes of said transistors 13 and 14 are connected, through resistors 17 and 18, to the lines 5 and 6, respectively. The common collector electrode of the transistors 13 and 14 is connected to the point of connection between the resistors 21 and 22 and these latter two are, in turn, connected to the base electrodes of the transistors 19 and 20, respectively.

An electric condenser 23 having a polarity is inserted for connection between said point of connection and the line 6. A resistor is inserted for connection between the point of connection of the resistors 21, 22 and the common emitter electrode of the transistors 19 and 20, while the collector electrodes of the transistors 19 and 20 are connected to the lines 5 and 6, respectively. An energizing coil $L_1$, which will be later described, is inserted for connection between the common emitter electrode of the transistors 19 and 20, and the neutral point of of the power sources $E_1$ and $E_2$. Also, a damping coil $L_2$, which will be described later, is inserted for connection between the common base electrode of the switching transistors 8, 9 and the point of connection between the resistors 10, 11 which are connected to the emitter electrodes of the transistors 8 and 9, respectively.

An electromagnetic device 24 is fabricated with a cylindrical magnet 25 and includes a movable element 26 which is made of a magnetic material and is rotatably supported by a supporting shaft 26a which is concentric with said cylindrical magnet 25, an aforesaid energizing coil $L_1$ which is wound so as to avoid the occurrence of magnetic coupling with said element 26, and also an aforesaid damping coil $L_2$. A known diaphragm means 27 is disposed in the foreground of the photo-resistor 1.

Said diaphragm means 27 is so operated as to compensate for the changes in the resistance of the photo-resistor 1 in synchronous action with the movable element 26. More particularly, said diaphragm means 27 is operated in such fashion that the diameter or the size of the diaphragm aperture is reduced when the resistance value of said resistor becomes smaller due to an increase in the amount of the incident light and also that the aperture is widened when the resistance value of said resistor becomes greater due to a decrease in the amount of the incident light.

It is important to note, however, that in the aforesaid system of the present invention the damping coil $L_2$ is disposed in such manner that the polarity of the induced voltage generated in said coil is opposite to the polarity of the unbalanced voltage generated between the outputs A and B of the Wheatstone bridge.

Figure 2:
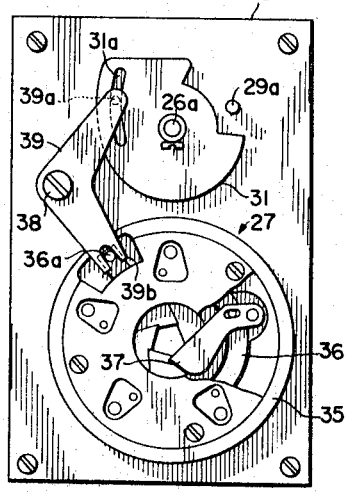
FIG. 2 is a front elevational view, partly broken away, of the apparatus shown in FIG. 1.

In FIGS. 2 and 3, an electromagnetic device 24 is shown as being of the type for use as an exposure amount controlling means in a photographic camera. The aforesaid electromagnetic device 24 is seen to be mounted to the back of a base plate which is detachably mounted, by means of screws or the like (not shown), to the front part of the camera body which is partly shown with dot-dash lines 28. This electromagnetic device 24 has a casing 30 of a cylindrical shape.

A cylindrical magnet 25 is fixed to the internal peripheral surface of said casing 30. A cylindrical movable element 26 having a shaft 26a which is rotatably supported on the side walls of said casing 30 is inserted inside said cylindrical magnet 25 in concentric relationship therewith. The cylindrical movable element 26 is wound with an energizing coil $L_1$ and also with a damping coil $L_2$, independently of each other, as has been previously described, and is so arranged as to be operative in such manner that when a current is caused to flow in said energizing coil $L_1$, said cylindrical movable element 26 is angularly displaced by virtue by the interaction between the magnetic field produced by said energizing coil $L_1$ and the magnetic field of said cylindrical magnet 25.

One end of said shaft 26a extends through the base plate 29 and the front face thereof. A control disk 31 which is restricted in its range of movement by a pin 29a protruding outwardly from the face of the base plate 29 and which is provided with a slot 31a is fixed to said one end of the shaft 26a. Also, on the back of said base plate 29 is securely mounted, adjacent to said electromagnetic device 24, a mirror box 32 by means of a flange 32a and screws. The end wall of said mirror box 32 located on the side where said flange 32a is formed is open, while the opposing end wall is provided with an aperture 32b through which a flux of light of the image to be photographed is passed. A half mirror 33 is disposed inside said mirror box 32 at an angle of 45 degrees relative to the optical axis. The mirror box 32 is provided with an opening 32c on that portion of its peripheral wall located in the path of the reflected light O' coming from said half mirror 33. A previously described photo-resistor 1 constituting one arm of the Wheatstone bridge is positioned so as to face said opening 32c by means of a bracket 34.

On the front face of said base plate 29 is mounted, co-axially with said optical axis O, a well-known diaphragm means 27 for use in a camera, comprising a housing 35, a diaphragm operating ring 36 rotatably mounted in said housing 35, and a plurality of diaphragm blades 37 operated by said diaphragm operating ring 36. With respect to the aforestated arrangement of the mirror box and the diaphragm means, it should be understood that the internal diameter of the mirror box 32 is in agreement with at least the maximum diaphragm aperture of the diaphragm means 27.

A crank lever 39 is pivotally mounted to a shaft 38 provided on said base plate 29 so that the lever can make a pivotal movement about said shaft. A pin 39a is provided on one end of said crank lever 39 so as to engage in the slot 31a formed in said control disk 31 while a fork portion 39b formed on the other end of the crank lever engages a pin 36a formed on the diaphragm operating ring 36. An objective lens means 40 is disposed in the foreground of the diaphragm means 27 on the optical axis O.

In the background of the mirror box 32 on the optical axis O are disposed, in alignment, a shutter means 41 and a film 42 which is to be exposed to light. It is important to note that an arrangement is provided so that during the movement of the slot 31a of the control disk 31 from one end to the other end relative to the pin 39a of the crank lever, the diaphragm blades 37 move from their maximum diaphragm position to their minimum diaphragm position.

Description will next be directed to the function of the aforesaid system. Let us assume that the photo-resistor 1, the variable resistor 2 and the resistors 3 and 4 have their values designated as $R_1$, $R_2$, $R_3$ and $R_4$, respectively. If the Wheatstone bridge is in its balanced state, or in other words, if the resistance values $R_1$, $R_2$, $R_3$ and $R_4$ are arranged so that $R_1 \cdot R_4 = R_2 \cdot R_3$, then there is generated no voltage whatsoever in the output connection between A and B of said bridge, and as a consequence, neither one of the transistors 8 and 9 is actuated. Accordingly, there is no appreciable current flowing in the energizing coil $L_1$, and the movable element 26 remains immovable in its present position. Assuming now that a change has occurred in the intensity of the light incident to the photo-resistor 1, causing a change in its resistance value and that as a result the relation between the resistance values of the respective resistors have been altered to: $R_1 \cdot R_4 > R_2 \cdot R_3$, there is generated an unbalanced positive voltage in the output point of connection A of the Wheatstone bridge and an unbalanced negative voltage in the ouput point of connection B, and as a consequence, the transistor 8 is rendered to a "cut-off" state, while the mating transistor 9 is brought into an "active" state. Accordingly, the transistors 13 and 19 are rendered to an "off" state, and the transistors 14 and 20 are put into an "active" state, causing a current to flow in the energizing coil $L_1$ in the direction of the arrow indicated in solid line. On the contrary, if the relationship between the respective resistors is altered to: $R_1 \cdot R_4 < R_2 \cdot R_3$, an unbalanced negative voltage is generated in the output point of connection A of the Wheatstone bridge, and an unbalanced positive voltage in the output point of connection B, causing the state of the transistors 8, 13 and 19 to be shifted to an "active" state, respectively, while that of the transistors 9, 14 and 20 to a "cut-off" state, respectively. As a consequence, a current in the direction of the dotted arrow is caused to flow in the energizing coil $L_1$.

When a current in the direction of either the solid arrow or the dotted arrow in the reverse direction flows through the energizing coil $L_1$, the movable element 26, in response to the current, rotates and changes its position either clockwise or counterclockwise. By operating the diaphragm means 27 in synchronism with said rotation of the movable element 26, the change in the resistance value $R_1$ due to the change in the intensity of the light incident to the photo-resistor 1 is compensated for, so that the movable element 26 is again rotated until it stops its movement when the Wheatstone bridge restores its balance.

The aforesaid relative movements will now be discussed in further detail with respect to the embodiment illustrated in FIGS. 2 and 3.

In FIG. 2, when a current in the direction indicated by a solid arrow flows in the energizing coil $L_1$, the rotary shaft 26a of the electromagnetic device 24 effects clockwise rotation, causing the control disk 31 to rotate clockwise. As a consequence, the slot 31a of the control disk causes, through the pin 39a, the crank lever 39 to make clockwise rotation about the shaft 38. This clockwise rotation of the crank lever 39 causes the fork portion 39b of the crank lever 39 to engage the pin 36a of the diaphragm operating ring 36 to rotate the diaphragm operating ring 36 counterclockwise so as to move the diaphragm blades 37 till they assume a position of a reduced diaphragm aperture. As a natural consequence, the amount of light entering through the objective lens 40 and into the mirror box 32 is reduced. A portion of the reduced incident light passes straight along the optical axis O through the shutter means 41 and reaches the film 42 to expose the latter to said light, while the remaining portion of the incident light is reflected from the half mirror 33 and this reflected light passes through the opening 32c to reach the photo-resistor 1.

The amount of light reaching the photo-resistor 1 is gradually reduced with the gradual narrowing of the diaphragm blades. When the resistance $R_1$ of the photoresitor 1 has thus reached a value at which the Wheatstone bridge is again put into a state of equilibrium, the movable element 26 ceases its movement. On the other hand, when a current in the direction of the dotted line is passed through the energizing coil $L_1$, or in other words, when the intensity of the light incident to the photoresistor 1 is reduced, the movable element 26 and accordingly, the diaphragm means 27 effect a movement in a direction reverse to that stated in connection with the foregoing occasion, that is, the diaphragm blades are widened so as to gradually increase the amount of light reaching the photo-resistor 1 until the resistance value thereof again puts the Wheatstone bridge into a state of equilibrium at which the movable element 26 again ceases its movement.

The afore-discussed system is advantageous in that it effectively eliminates, by the provision of a damping coil $L_2$ having the foregoing structure and the foregoing connection pattern, the undesirable occurrence of oscillation of the movable element 26 accruing principally from the "light amount"-"resistance value" characteristics of the photoconductive material constituting the photo-resistor 1 and also eliminates the inertia of said movable element 26 which is due to a sharp change in the amount of light.

A photoconductive material, in general, would not undergo a change in its resistance value immediately after a change has taken place in the intensity of light incident thereto, but requires a certain small length of time or delay in time before its resistance value effects a change in response to said change in the intensity of the incident light.

In case the system of the prior art lacking the damping coil $L_2$ is used, the system will work in the following manner.

When there occurs a change in the resistance value of the photo-resistor 1, causing the movable element 26 to rotate to change its position, said movable element 26 will cease its movement for a moment when there is established a state of equilibrium in the Wheatstone bridge, or in other words, when there is formed a relation of $R_1 \cdot R_4 = R_2 \cdot R_3$. On account of the aforesaid delay in time, however, the Wheatstone bridge is placed, immediately after the cease of movement of said element 26, into a relation of resistance: $R_1 \cdot R_4 \neq R_2 \cdot R_3$, causing the Wheatstone bridge to plunge into an unbalanced state again.

More concretely, when, for example, there occurs an increase in the intensity of light incident to the photoresistor 1 and when, accordingly, the resistance value $R_1$ of said resistor 1 is reduced, the movable element 26 acts to cause the diaphragm aperture of the diaphragm means 27 to reduce its diameter or size so as to increase said resistance value $R_1$, with a result that the Wheatstone bridge is placed again into a balanced state. However, the resistance value $R_1$ of the photo-resistor 1 continues to increase slightly for a small length of time after the Wheatstone bridge has already reached the equilibrium state.

Such delay in the action of the photo-resistor 1 causes a voltage of reverse polarity to be generated in the output points of connection A and B of Wheatstone bridge so that the movable element 26 is displaced in the direction opposite to the initial direction, to widen the diaphragm aperture. With the widening of the diaphragm aperture, the amount of light incident to the photo-resistor increases, resulting in that the resistance value of the resistor reduces again. As a consequence, the polarity of the voltage generated between the output points of connection A and B of the Wheatstone bridge is again reversed, so that the movable element 26 is actuated again, reducing the size of the diaphragm aperture. Thus, the movable element 26 oscillates back and forth across the equilibrium point. However, such phenomenon is effectively eliminated by the use of the damping coil $L_2$.

Specifically, the movement of the movable element 26 causes an induced voltage to be produced in the damping coil $L_2$ by virtue of the permanent magnetic field which is produced by the cylindrical magnet 25. Since this induced voltage acts so as to reduce the unbalanced voltage which is generated between the output points of connection A and B of the bridge, it serves to substantially prevent the oscillation of the movable element 26 which is caused by the occurrence of the alternate on-off actions of the transistors 8 and 9 in the neighbourhood of the equilibrium of the bridge, due to the delay in the time of changing the resistance of the photo-resistor 1, and to thereby bring the movable element 26 to a halt immediately when the bridge is balanced. Furthermore, since the magnitude of the induced voltage which is generated in the damping coil $L_2$ is proportionate to the displacement velocity of the movable element 26, the latter would not change its position abruptly even when there is a sharp change in the resistance value $R_1$ of the photo-resistor 1, but instead, the movable element 26 can change its position at a substantially constant velocity. Let us now designate the resistance values of the biasing resistor 7 and the resistors 10 and 11 as: $R_7$, $R_{10}$ and $R_{11}$, respectively, and the maximum unbalanced voltage generated between the output points of connection A and B of the bridge as $e_{max}$, and the induced voltage generated in the damping coil $L_2$ when the movable element 26 has made a displacement at the highest possible speed as $e'_{max}$. It will be easily understood by those skilled in the art that a most effective damping action of the damping coil $L_2$ is obtained by selecting the values $R_7$, $R_{10}$ and $R_{11}$ so as to satisfy the following relationship:

$$\frac{R_1+R_7}{R_{10}} = \frac{R_1+R_7}{R_{11}} \cdot \frac{e_{max}}{e'_{max}}$$

Also, in the prior system, it sometimes occurs that neither of the transistors 8 and 9 is actuated depending upon the magnitude of the unbalanced voltage generated between the output points of connections, resulting prncipally from the $B_{BE}-I_B$ characteristic of the transistors 8 and 9. More specifically, when the resistance value of the photo-resistor effects a very limited change, the magnitude of the unbalanced voltage generated between the output points of connections A and B of the bridge is small. In such case, neither of the transistors 8 and 9 is actuated. Since in the arrangement of the present invention, a resistor or a thermistor 12 is inserted for connection between one of the output points of connections, namely, between A and B, of the bridge to eliminate the inconvenience of the system of the prior art, it is possible to prevent the dynamic sensitivity of the transistors 8 and 9 from diminishing owing to the influence of the voltage $V_{BE}$ between the base electrode and the emitter electrode of these transistors, and it is also possible to actuate either the transistor 8 or the transistor 9 even when an unbalanced voltage of a slight degree is generated between the output connections A and B of the bridge. By the use of a thermistor in the circuit of the instant case, it is also possible to prevent a change from occurring in the dynamic sensitivity of the transistors 8 and 9 being caused by a change in the ambient temperature.

Furthermore, in the arrangement of the prior art, the current which flows in the energizing coil $L_1$ tends to contain an alternating component of a relatively high frequency due mainly to such factors as the structure of the electromagnetic device 24 per se, or the coupling relation between the electric circuit and the electromagnetic device 24, resulting in an inconvenience that the movable element 26 will make a stepwise movement during its displacement motion. Since, according to the present invention, there is inserted an electric condenser 23 for connection between the line 6 and the point of connection of the resistors 21 and 22 which are connected to the base electrodes of the transistors 19 and 20, the aforesaid alternating component is positively bypassed so that the alternating component can be removed from the current flowing through the energizing coil $L_1$. As a consequence, the actuator or the movable element 26 can effect a smooth and continuous motion of displacement. In this instance, said condenser 23 may be inserted between the line 5 and the connection of the transistors 21 and 22, and furthermore, an identical effect can be obtained by inserting, as are indicated by the dotted lines in FIG. 1, a condenser between the collector electrode of the transistor 8 and the point of connection of the photo-resistor 1 and the resistor 3, and inserting still another one between the collector electrode of the transistor 9 and the point of connection of the variable resistor 2 and the resistor 4, respectively.

A preferred embodiment of the present invention wherein a photo-resistor is used in one of the branches of a Wheatstone bridge has been discussed. This, however, represents only one example of the present invention, and it should be understood that various modification, alterations and improvements may be made with respect to the structures and functions of the minor parts of the system of the present invention without departing from the spirit of the present invention.

Therefore, such modifications, changes and improvements should all be included in the scope of the present invention which is given in the attendant claims.

What is claimed is:

1. A servo-mechanism comprising a Wheatstone type electric bridge having branches composed of resistors and an electromagnetic device including a permanent magnet and a movable element influenced by the magnetic field of said magnet, means to connect said electromagnet device to an output terminal of said bridge to be actuated by an unbalanced voltage generated in said output terminal when said bridge is in an unbalanced state, means to balance said bridge again by virtue of the movement of said electromagnetic device, at least one of said resistors being composed of a photo-resistor adapted to change its resistance value in response to a change in the intensity of light incident thereto, a p-n-p type transistor and an n-p-n type transistor inserted for connection between the output points of connection of said bridge, said transistors having a common base electrode connected to one of the output points of connection of said bridge and having emitter electrodes connected to the other of said output points of connection of said bridge, said servo-mechanism containing at least one transistor amplifier including a transistor connected to the collector electrodes of said p-n-p type and said n-p-n type transistors, power sources connected to the input points of connection of said bridge for actuating said transistor amplifier, an energizing coil member and a damping coil member both being wound around said movable element, and a diaphragm means disposed in the foreground of said photo-resistor and operative to define the diaphragm aperture to alter the light receiving area for the light incident to said photo-resistor so that, when said bridge is placed into an unbalanced state due to a change in the amount of light incident to said photo-resistor, said bridge may be able to resume the balanced state, said energizing coil member being inserted for connection between the common emitter electrode of said transistor of said transistor amplifier and said power sources, said damping coil member being inserted for connection between the output points of connection of said bridge in such manner that the polarity of the voltage induced in said energizing coil member is reverse to the polarity of the voltage produced between the output connections of said bridge.

2. A servo-mechanism according to claim 1, further comprising a biasing resistor inserted for connection between one of the output points of connection of said bridge and the common base electrode of said p-n-p type and said n-p-n- type transistors, two resistors connected in series inserted for connection between the emitter electrodes of said transistors, respectively, a damping coil member inserted for connection between said common electrode and the point of connection of said two resistors, and means to select the ratio of the resistance value of either one of the resistors of said two resistors to the total resistance value of said photo-resistor and said biasing resistor so that said ratio is substantially equal to the ratio of the voltage induced in said damping coil member when said movable element effects displacement at the maximum permissible displacement velocity to the maximum unbalanced voltage produced between the output points of connection of said bridge.

3. A servo-mechanism according to claim 1, further comprising a resistor, preferably a thermistor, inserted for connection between the points of connection of the respective emitter electrodes of said switching transistors and said branches of said bridge, to thereby prevent a reduction in the dynamic sensitivity of said switching transistors.

4. A servo-mechanism according to claim 1, further comprising an electric condenser inserted for connection between the point of connection of a biasing resistor connected to the respective base electrodes of two amplifying transistors and the collector electrode of either one of said two transistors.

5. A servo-mechanism according to claim 1, further comprising an electric condenser inserted for connection between the respective collector electrodes of said switching transistors and the input point of connection of said bridge.

References Cited

UNITED STATES PATENTS

| | | | |
|---|---|---|---|
| 3,283,232 | 11/1966 | Ditto | 318—31 |
| 3,327,186 | 6/1967 | Gregory et al. | 318—30 XR |
| 3,340,785 | 9/1967 | Adler et al. | 318—28 XR |

BENJAMIN DOBECK, *Primary Examiner.*

U.S. Cl. X.R.

318—28, 480